US008720601B2

(12) United States Patent
Mucig et al.

(10) Patent No.: US 8,720,601 B2
(45) Date of Patent: May 13, 2014

(54) PRESSURISED AIR PICK DEVICE WITH VARIABLE CONTROL

(75) Inventors: Alain Mucig, Chaponost (FR); Patrice Charlat, Saint Didier sur Rochefort (FR); Julien Liotier, Montbrison (FR)

(73) Assignee: Sullair, LLC, Michigan City, IN (US)

( * ) Notice: Subject to any disclaimer, the term of this patent is extended or adjusted under 35 U.S.C. 154(b) by 434 days.

(21) Appl. No.: 12/812,845

(22) PCT Filed: Jan. 13, 2009
(Under 37 CFR 1.47)

(86) PCT No.: PCT/FR2009/050043
§ 371 (c)(1),
(2), (4) Date: Oct. 6, 2010

(87) PCT Pub. No.: WO2009/092956
PCT Pub. Date: Jul. 30, 2009

(65) Prior Publication Data
US 2011/0174512 A1 Jul. 21, 2011

(30) Foreign Application Priority Data
Jan. 15, 2008 (FR) .................................... 08 00201

(51) Int. Cl.
*B23B 45/04* (2006.01)

(52) U.S. Cl.
USPC ............................ 173/200; 173/169; 173/201

(58) Field of Classification Search
USPC ............ 173/200, 201, 135, 133, 169; 91/239, 91/299
See application file for complete search history.

(56) References Cited

U.S. PATENT DOCUMENTS

| | | | | |
|---|---|---|---|---|
| 932,421 A * | 8/1909 | Albree | ............................ | 91/282 |
| 947,861 A * | 2/1910 | Soley | ............................ | 91/282 |
| 973,378 A * | 10/1910 | Otto | ............................ | 91/298 |
| 996,889 A * | 7/1911 | Schumacher | .................. | 91/217 |
| 1,247,080 A * | 11/1917 | Christiansen | .................. | 91/282 |
| 1,329,774 A * | 2/1920 | Keller | .......................... | 173/169 |

(Continued)

FOREIGN PATENT DOCUMENTS

| | | |
|---|---|---|
| CH | 227392 A | 6/1943 |
| DE | 1184304 B | 12/1964 |
| FR | 2926237 | 7/2009 |
| GB | 2155842 A | 10/1985 |

OTHER PUBLICATIONS

Search Report and Written Opinion for FR0800201.

*Primary Examiner* — Thanh Truong
*Assistant Examiner* — Nathaniel Chukwurah
(74) *Attorney, Agent, or Firm* — Carlson, Gaskey & Olds, PC

(57) ABSTRACT

Pressurized air pick device with variable control that comprises a cylinder and piston assembly for actuating a picking member, and a distribution portion with variable control of the pressurized air to said cylinder and piston assembly, the distribution portion including an upper body, a lower ring and a movable fluid-distribution slider capable of sliding between the body and the ring, characterized in that the distribution portion is housed in the cylinder of the cylinder and piston assembly at the upper portion thereof and coaxially therewith, the variable control for the fluid is housed in the head of the cylinder closing the upper portion of the cylinder connected to a fluid-supply section, and said upper portion of the cylinder includes two channels for conveying pressurized air in tight communication with the distribution portion through the radial channels thereof.

16 Claims, 7 Drawing Sheets

(56) References Cited

U.S. PATENT DOCUMENTS

Figure 1:
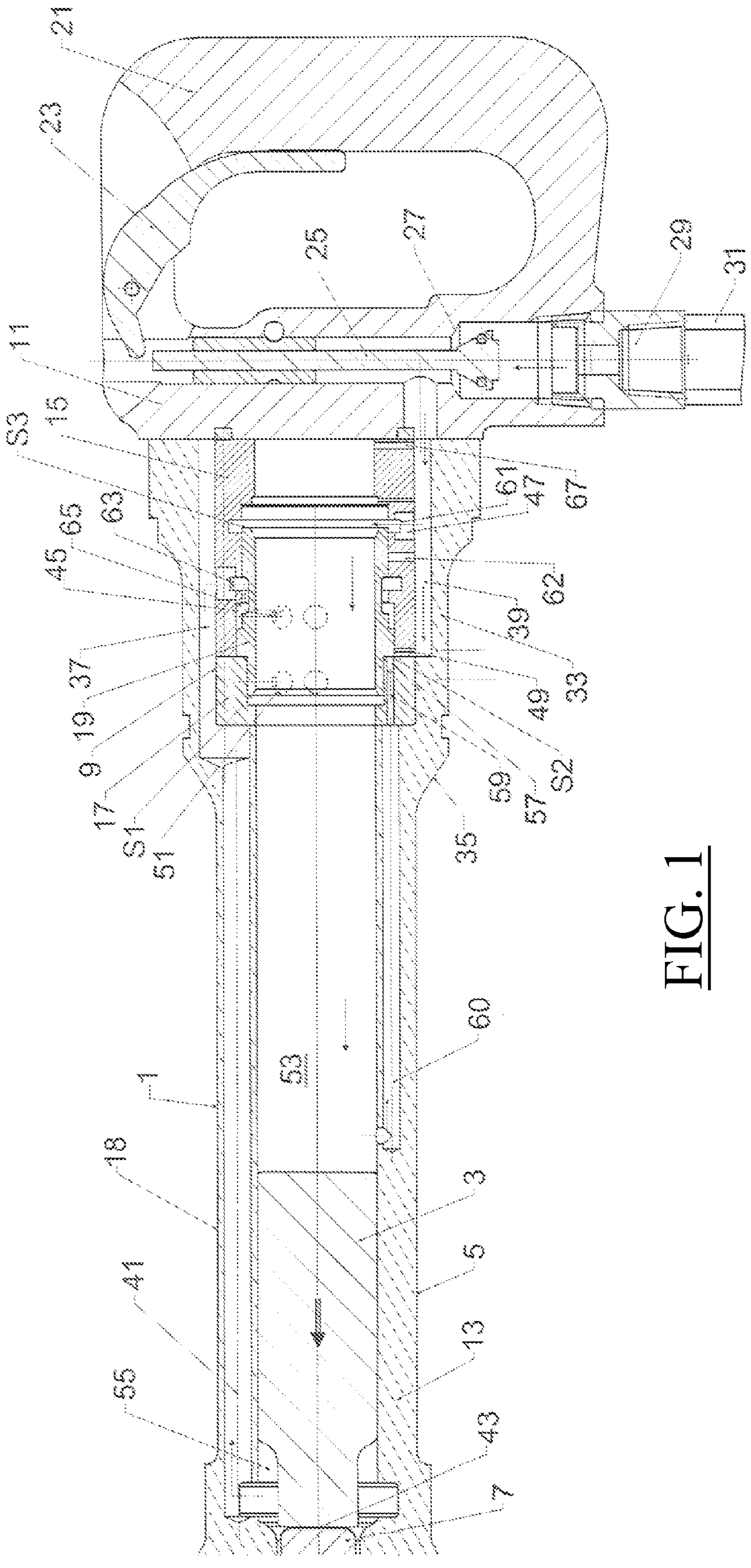
Figure 2:
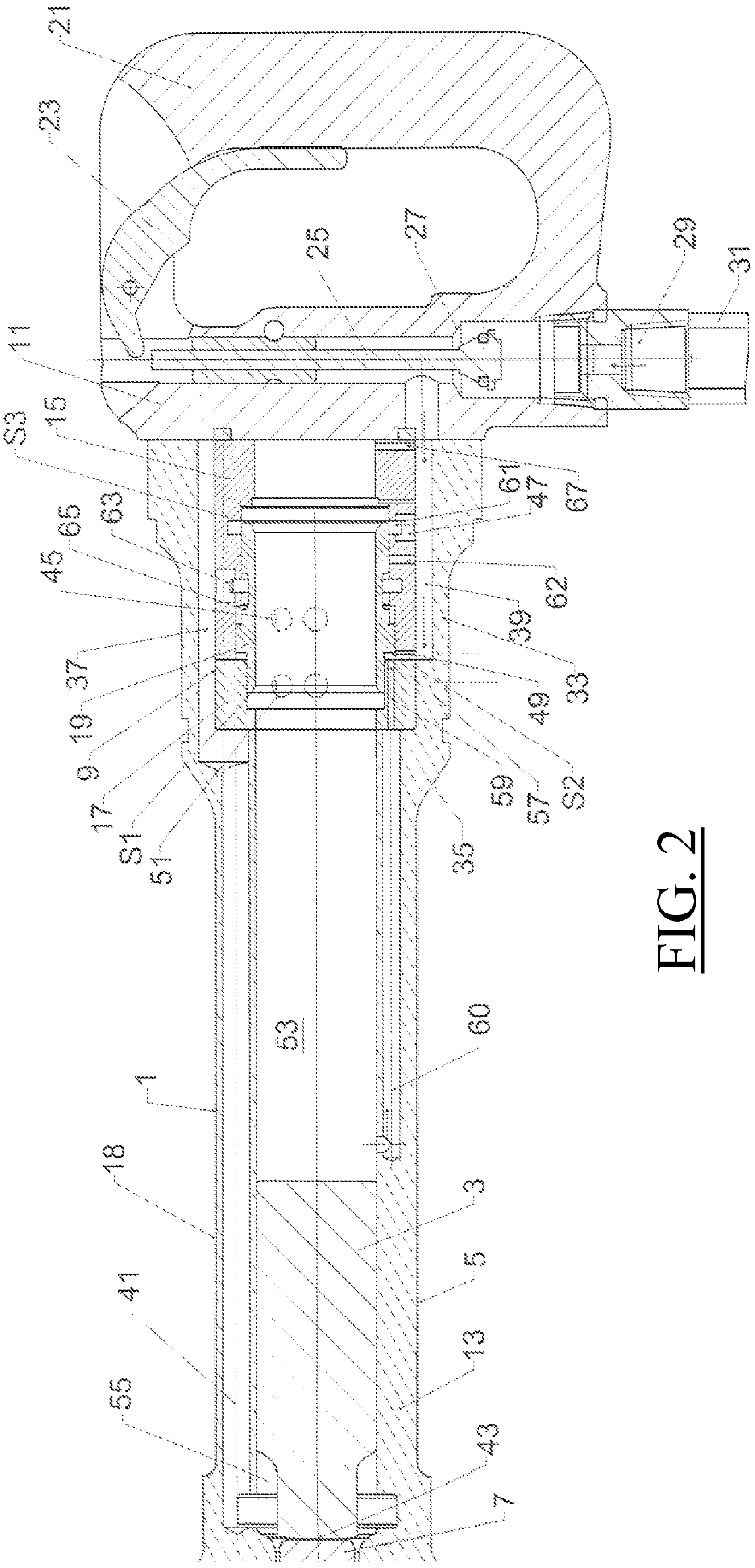
Figure 3:
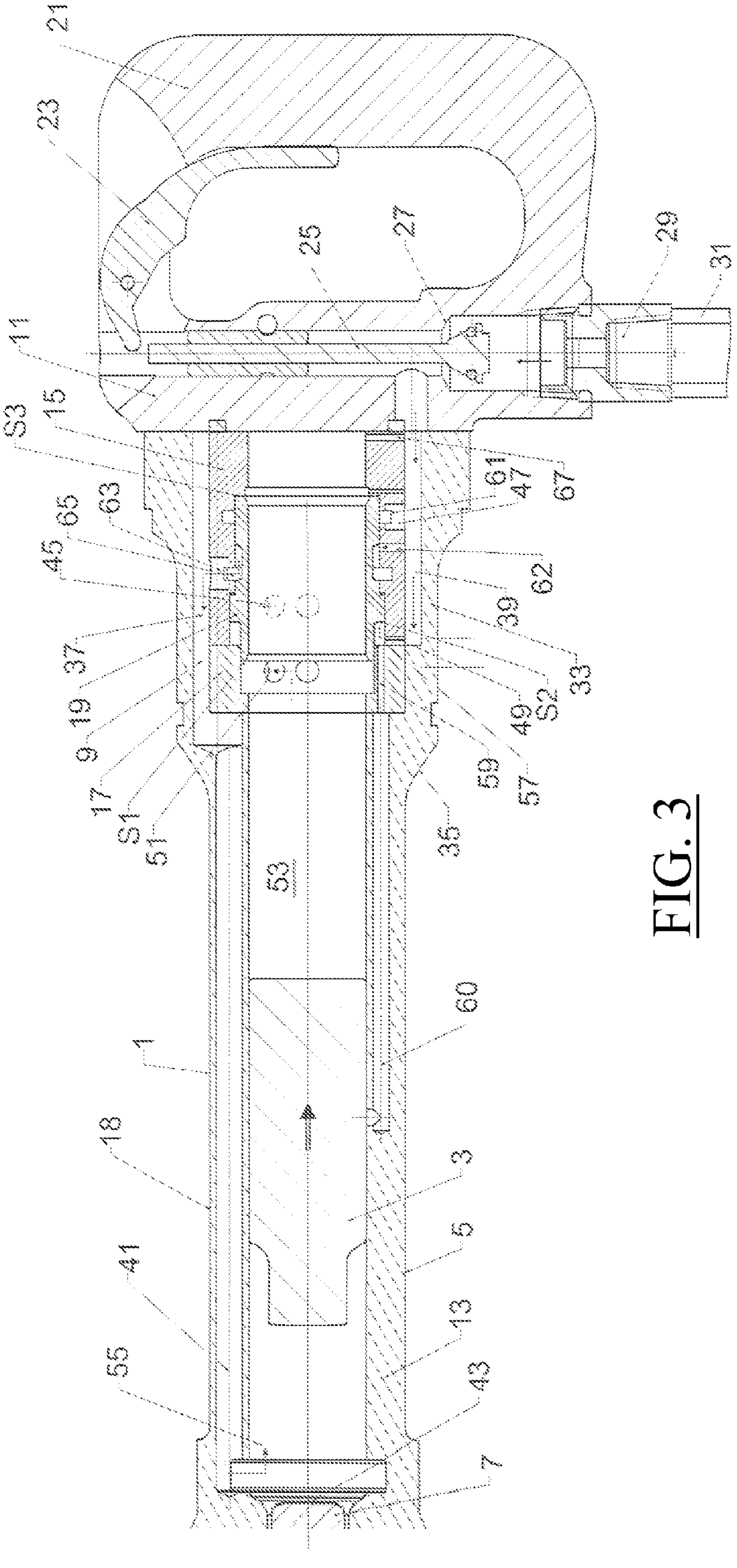
Figure 4:
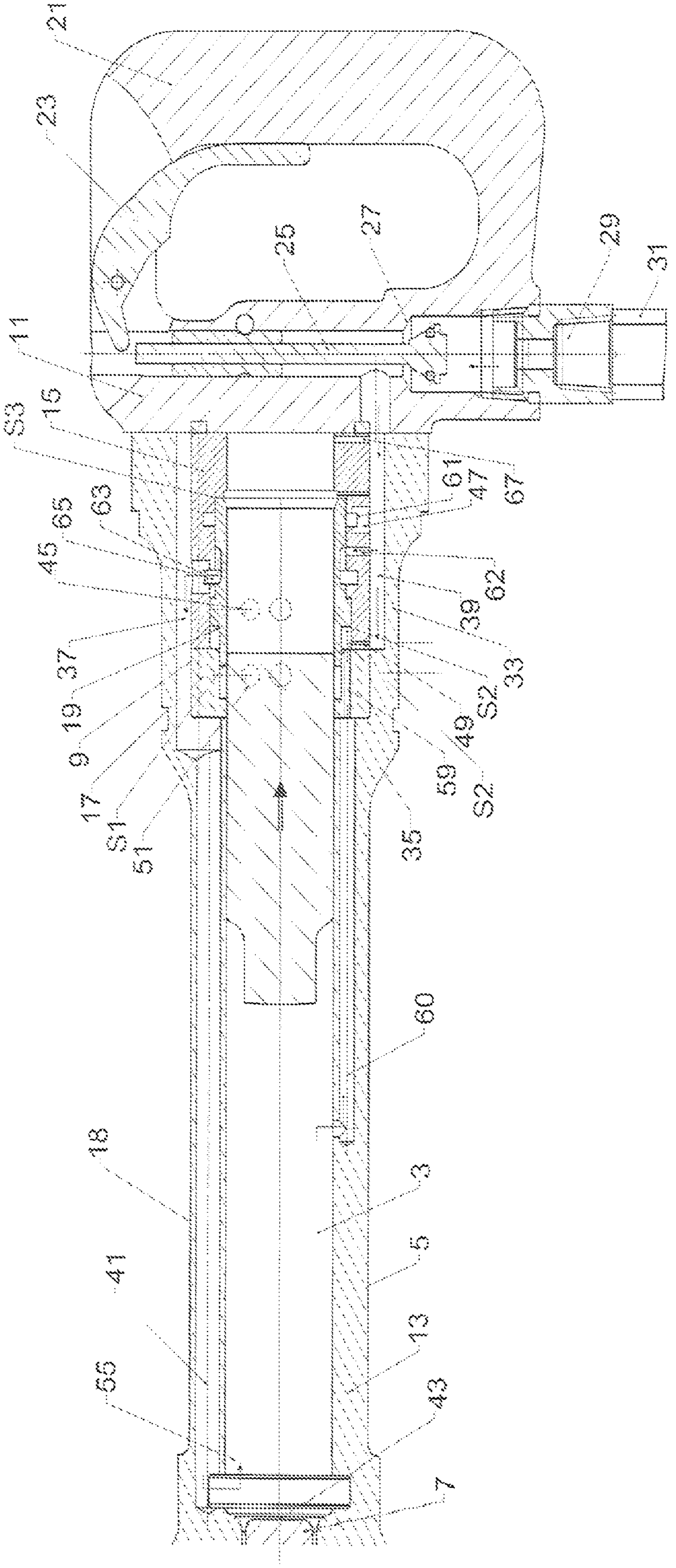

| | | | | | |
|---|---|---|---|---|---|
| 1,332,845 | A | * | 3/1920 | Keller | 173/169 |
| 1,528,781 | A | * | 3/1925 | Peck | 91/276 |
| 1,557,777 | A | * | 10/1925 | Santos | 91/276 |
| 1,637,001 | A | * | 7/1927 | Katterjohn | 91/239 |
| 1,707,325 | A | * | 4/1929 | Shaff | 173/135 |
| 2,254,695 | A | | 9/1941 | Feuhrer | |
| 2,275,102 | A | * | 3/1942 | Fitz | 173/73 |
| 2,415,521 | A | | 2/1947 | O'Farrell | |
| 3,060,894 | A | | 10/1962 | Dean, Jr. et al. | |
| 3,167,135 | A | * | 1/1965 | Wilmer | 173/31 |

* cited by examiner

PRESSURISED AIR PICK DEVICE WITH VARIABLE CONTROL

This application is a United States National Phase application of PCT Application No. PCT/FR2009/050043 filed Jan. 13, 2009.

The invention relates to a pressurised air pick device with variable control.

A pick device with variable control is known in which the distribution element, adjacent to and coaxial with the cylinder, comprises an upper body and a lower ring housing a movable fluid distribution slider, in which the body is provided with a plurality of coaxial fluid-conveying channels formed in the thickness of the wall thereof. However, this arrangement of channels formed in the body and coaxial therewith requires the channels to have a small diameter so as to maintain the integrity of the body, and requires a large number of channels in order to achieve the desired flow rate of fluid. This consequently requires complex and expensive machining of the distribution element of the pick device.

The invention sets out to overcome this drawback and proposes a pressurised air pick device with variable control that comprises a cylinder and piston assembly for actuating a picking member, and a distribution portion with variable control of the pressurised air to said cylinder and piston assembly, the distribution portion including an upper body, a lower ring and a movable fluid-distribution slider capable of sliding between the body and the ring, characterised in that the distribution portion is housed in the cylinder of the cylinder and piston assembly at the upper portion thereof and coaxially therewith, the variable control of the fluid is housed in the head of the cylinder closing the upper portion of the cylinder connected to a fluid-supply section, and said upper portion of the cylinder includes two channels for conveying pressurised air in tight communication with the distribution portion through coaxial radial channels thereof which are outside and adjacent to the latter, one of the conveying channels being intended more particularly for supplying the cylinder and piston assembly in conjunction with the supply section and the variable control portion of the fluid, and for controlling the movement of the slider of the distribution portion and the other supply channel is intended to allow alternate raising of the piston and escape of the fluid at the lower level of the cylinder and piston assembly, the said channels having a cross-section in the shape of a groove that is open towards the radial channels of the distribution portion.

The conveying channel is naturally formed outside the distribution portion and advantageously communicates with little play and in sealed manner with radial channels formed in the body and ring of the distribution portion.

The conveying channel may extend coaxially and adjacent to the distribution portion, over the length thereof, and be in the form of a groove with its opening facing the said radial channels of the distribution portion.

The section of this groove, which is advantageously semi-cylindrical, may be relatively great, thus being able to allow a relatively large flow rate of fluid to pass through.

It will be appreciated that this arrangement according to the invention avoids the formation of coaxial channels in the body of the distribution portion, which are difficult to machine and have to be provided in large numbers to increase the flow rate of the fluid, and now requires only an inner groove to be machined on the wall of the cylinder, in its upper portion adjacent to the distribution portion, and radial channels to be machined in the distribution portion without limiting their cross-section to the thickness of the body, this machining being substantially simplified compared with the above-mentioned comparable prior-art device, and moreover not limiting the cross-section of the radial channels of the distribution portion.

The variable control of the fluid is housed in the head of the cylinder closing off the upper portion of the cylinder, being connected to the fluid supply section by at least one flexible supply tube, just below the operating handle of the pick device, which is fixed to the cylinder head.

The upper portion of the cylinder advantageously comprises two pressurised air conveying channels communicating with the distribution portion, coaxial therewith and preferably diametrically opposite, with respect to the axis of the cylinder and piston assembly, one of the conveying channels being intended more particularly for supplying the cylinder and piston assembly, in conjunction with the supply section and the variable control portion for the fluid, and for controlling the movement of the slider of the distribution portion, and the other conveying channel is intended to allow alternate raising of the piston and escape of the fluid at the lower level of the cylinder and piston assembly.

The ring of the distribution portion advantageously comprises at least one radial escape channel connected to a radial channel opening out at the upper portion of the cylinder, adapted to be opened or closed by the movable slider and enabling the escape of fluid to be opened when the piston rises. It further comprises at least one channel for controlling the raising of the open slider in the bottom position of the piston connected to a control channel for the cylinder opening into it above the piston in the bottom position.

The body of the distribution portion advantageously comprises at least one radial escape channel, suitably positioned thereon to be opened or closed by the movable slider and thereby allow, when opened, communication with said channel for raising the piston on downward actuation of the latter without compressing the fluid in the lower portion of the cylinder.

Moreover, the pick device may comprise a small radial channel formed at the upper portion of the body, known as the starter for the control of the slider, which, after stoppage of the upwardly directed pick device, allows the movable slider to be pushed towards the picking member and the pressure in the cylinder to be established, on actuation, to initiate the movement of the piston.

Naturally, the pick device according to the invention may operate at a high compressed air pressure (7 bars, for example) or at low pressure (below 2 bars) by increasing the cross-sections of the channels in order to obtain an analogous operating effect, or between the two.

Figure 7:
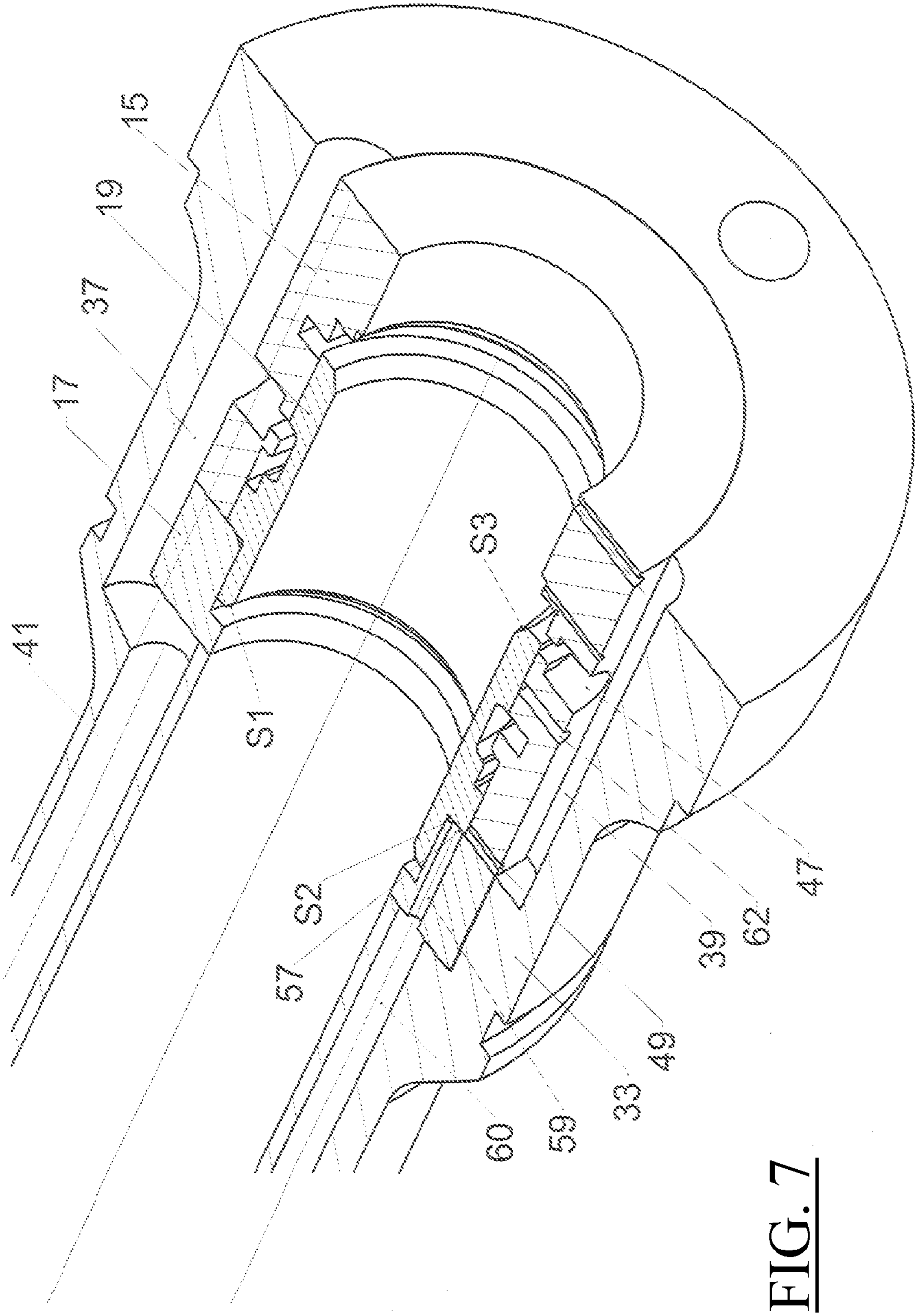

The invention is explained in more detail hereinafter by means of an exemplifying embodiment described with reference to the appended drawings, wherein:

FIGS. 1 to 6 show, in schematic axial section, the various operating phases of the pick device according to the invention and FIG. 7 is a perspective view, in section, of the distribution portion of the pick device.

With reference to the drawings, the various elements of the pick device 1 according to the invention will be described together with the phases of the movement cycle of the piston of the cylinder and piston assembly 5 of the pick device 1, in which they are brought into play.

The pick device 1 according to the invention essentially comprises a cylinder and piston assembly 5 for actuating a lower picking member 7, a distribution portion 9 for pressurised air (at 7 bars) and an upper head 11 closing off the cylinder 13 of the cylinder and piston assembly 5.

The distribution portion 9 is of cylindrical shape, coaxial with the cylinder 13, comprising a cylindrical upper body 15 and a lower ring 17 fixed tightly to the body 15 (by fitting), and a movable cylindrical slider 19 capable of sliding, with little play and in sealed manner, along a short distance (about 1 cm) between the body 15 and the ring 17.

The upper head 11 has a D-shaped upper operating handle 21 for the pick device. The handle 21 comprises a control trigger 23 for the pick device 1, which is adapted to be pressed in variable manner by the operator to allow variable control of the pick device 1. This trigger 23 in the operating position opens a valve 25 for supplying pressurised air to the device, to a greater or lesser extent, the valve 25 being movably mounted in the head 11 relative to a valve seat 27 of a fluid supply section 29 connected laterally to the head 11 by a flexible tube 31.

The distribution portion 9 is housed in the upper portion 33 of the cylinder 13 close to the upper head 11 carrying the operating handle. The ring 17 and the body 15 being of substantially the same external diameter as the cylinder 13, the upper portion 33 of the latter is slightly broadened with a kink 35 relative to the body of the cylinder 13, greater in diameter than the cylinder body 13, to contain the distribution portion 9.

This upper portion 33 is provided with two longitudinal channels coaxial with the cylinder 13, 37, 39, diametrically opposite and extending over the length of the latter. These channels 37, 39 (FIG. 7) have an open semi-cylindrical cross-section (in the shape of a groove) on the body 15 and the ring 17 of the distribution portion.

The upper channel 37 (above the axis of the cylinder in the drawing) is connected to an upper longitudinal channel 41 extending within the thickness of the cylinder body 13 and along its length, to the bottom thereof. This channel 41 is known as the piston raising channel 3, which enables the piston to move back up to the upper portion 33 of the cylinder once it has arrived at the bottom 43 of the cylinder. As already mentioned, it allows the air under the piston 3 to escape during the travel of the piston towards the bottom 43 of the cylinder, via two radial escape channels or holes 45 provided in the body 15 and suitably opened by the movable slider 19.

The other longitudinal channel 39 of the upper portion 33 of the cylinder or lower longitudinal channel 39 is connected mainly to a radial channel 47 of the body for supplying the cylinder with pressurised air, to a small radial channel 49 of the body for controlling the movement of the slider 19 and to other radial auxiliary channels of the body 15 which will be detailed hereinafter.

The ring 17 and the body 15 each comprise two radial escape holes or channels 51, 45 communicating with corresponding radial through-holes in the cylinder 13. The escape holes 51 of the ring are open as the piston 3 rises and as the slider 19 rises simultaneously, in order to decompress the upper chamber 53 of the cylinder (above the piston). As the piston 3 travels downwards, conversely, the escape holes 45 of the body 15 allow decompression of the lower chamber 55 of the cylinder (below the piston) via the said raising channel 41 communicating therewith, while the slider 19 has moved down and closed off the escape holes 51 of the ring 17.

The operation of the pick device 1 according to the invention will now be described. It depends on the movement of the movable slider 19 which controls the circulation of the fluid. This movement is linked to certain surfaces of the slider in contact with the fluid, which will participate in combination with the displacement of the slider. These surfaces correspond respectively to the lower edge surface S1 of the slider, to an upper shoulder surface S2 of a control chamber 57 for the slider, delimited between the body 15 and the slider 19 and communicating with a longitudinal control channel 59 of the ring (which itself communicates with a longitudinal channel 60 of the cylinder) and the said radial control channel 49 for the body, and an upper edge surface S3 of the slider 19.

This operation is described with reference to a set of steps detailed below.

Let us suppose that, in a first stage, the pick device 1 has stopped, the piston 3 and slider 19 are at the bottom, moved down by gravity, while the picking member 7 is at the bottom.

The operator presses the control trigger 23 (FIG. 1), the pressurised air enters the upper chamber 53 of the cylinder via the radial channel 47 for supplying the body. The fluid passes from this channel into the cylinder chamber via an annular groove 61 formed in the body 15, which assists its travel. The pressure of the fluid is applied to the surfaces S1, S2 and S3 and as S1+S2>S3 the slider 19 initiates an upwards movement.

The slider 19 moves upwards (FIG. 2) and frees the escape holes 51 of the ring 17 and in this way the control pressure on S1 and S3 on the slider is lost but the pressure on the surface S2 via the control channel 49 of the ring 17 is maintained and hence the slider 19 continues to move up to the upper end stop. The supply groove 61 is then closed off (FIG. 3) by the slider 19, which opens a raising channel 62, 63 of the body via a substantially central peripheral groove 65 and brings the fluid into communication with the raising channel 41. The piston of the cylinder 3 moves up and the air in the upper chamber 53 is evacuated through the open holes 51 in the ring 17.

Figure 5:
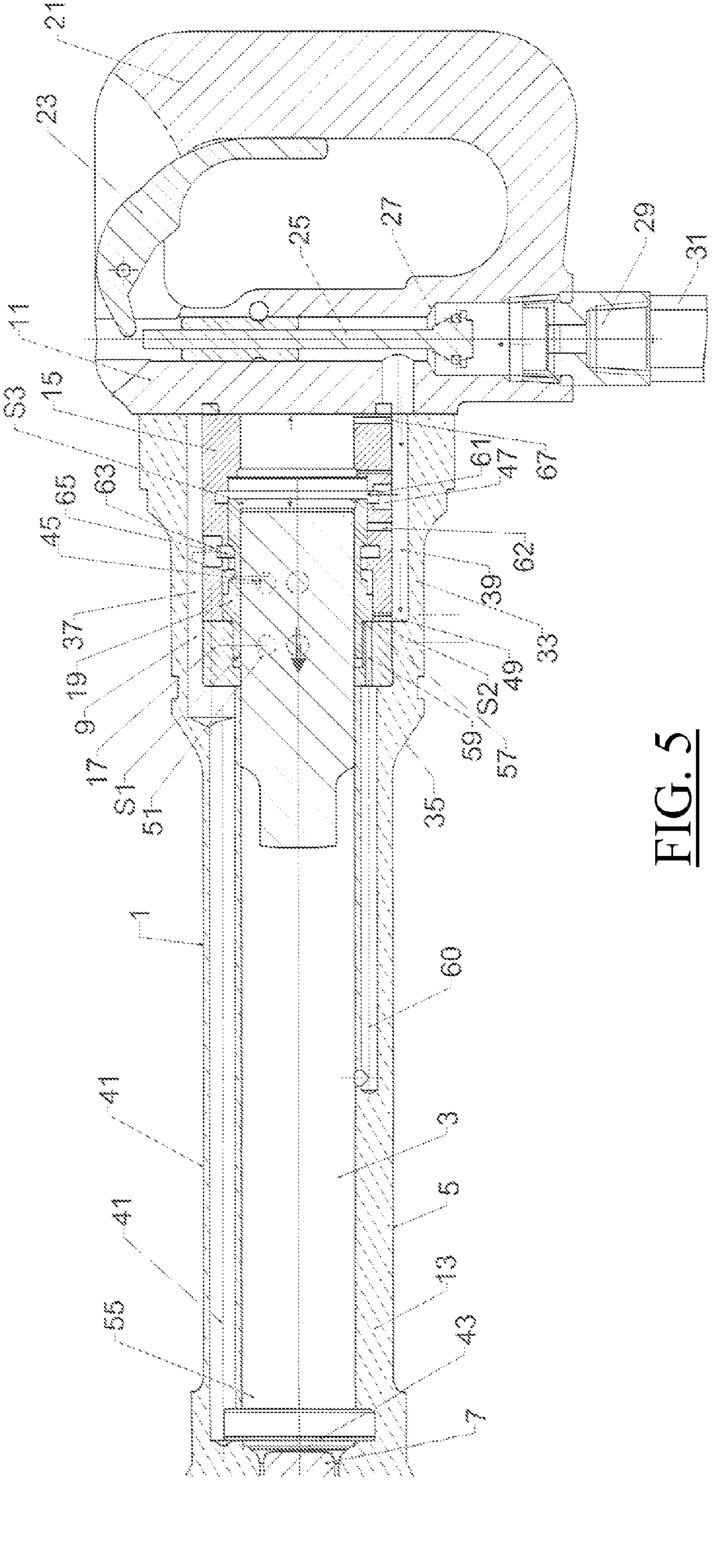
Figure 6:
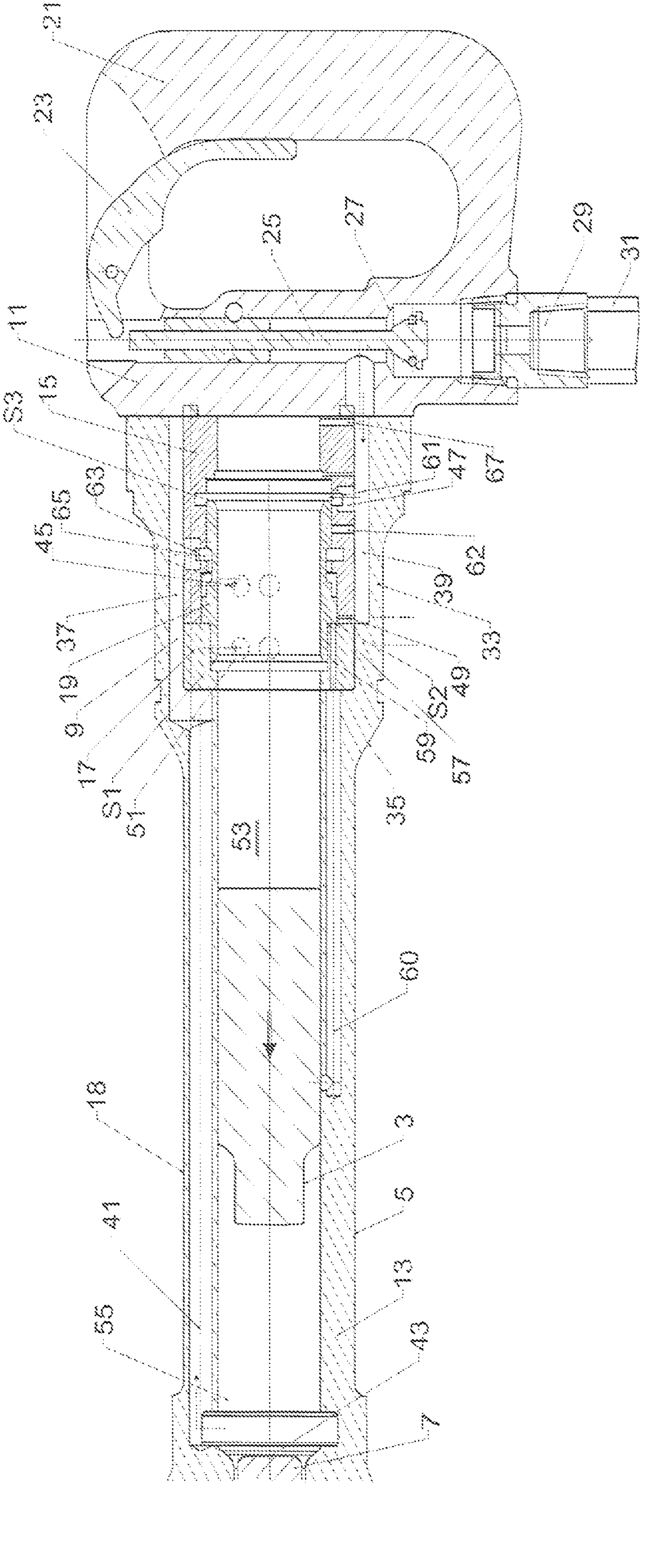

When the piston 3 arrives at the upper level (FIG. 4), an upper cushion of pressurised air is formed (with a pressure broadly greater than the supply pressure at S2), which is applied to S3 and pushes the slider 19 back down (FIG. 5).

Once the slider 19 has moved back down (FIG. 6) the supper chamber 53 is supplied with pressurised air via the supply channel 47 and the piston 3 moves back down to strike the picking member 7. It opens up the escape holes 45 of the body 15 and the raising channel 41 is then in communication with these escape holes 45, thus enabling the piston 3 to move back down without compressing the lower chamber 55 of the cylinder (FIG. 6), then the operating cycle shown in FIG. 1 resumes, with the piston 3 and slider 19 at the bottom.

Moreover, if the pick device 1 is used in upwardly directed manner, when stopped the slider 19 and the piston 3 will drop down towards the head 11 of the cylinder by gravity. In this case, at least one small radial channel 67 is provided which is referred to as the starting channel for controlling the slider in the upper portion of the body 15, thus enabling the supply pressure, when the control trigger 23 is activated, to be applied to the surface S3 and also to S2. As S2<S3, the slider 19 is pushed towards the picking member 7, thus starting the cycle of movement of the piston 3, as shown in FIGS. 4 to 6 and 1 to 3.

The foregoing shows the simplification of the distribution portion of the pressurised air pick devices with variable control according to the invention, and by increasing the machining tolerances relative to those of the conventional pick device, there is a reduced or even zero lubrication requirement, resulting in a longer service life.

The invention claimed is:

1. A pressurised air pick device with variable control that comprises a cylinder and piston assembly for actuating a picking member, and a distribution portion with variable control of the pressurised air to said cylinder and piston assembly, the distribution portion including an upper body, a lower ring and a movable fluid-distribution slider capable of sliding between the body and the ring, wherein the distribution portion is housed in the cylinder of the cylinder and piston assembly at the upper portion thereof and coaxially therewith, a fluid variable control is housed in the head of the cylinder closing the upper portion of the cylinder connected to a fluid-supply section, and said upper portion of the cylinder includes first and second longitudinal channels for conveying pressurised air in tight communication with the distribution portion through coaxial radial channels thereof, the first longitudinal channel being intended more particularly for supplying the cylinder and piston assembly in conjunction with the supply section and the variable control portion of the fluid, and for controlling the movement of the slider of the distribution portion, and the second longitudinal channel is intended to allow alternate raising of the piston and escape of the fluid at the lower level of the cylinder and piston assembly, the longitudinal channels each having a cross-section in the shape of a groove that is open towards the radial channels of the distribution portion; and wherein the ring of the distribution portion comprises at least one radial escape channel connected to a radial channel opening out at the upper portion of the cylinder, adapted to be opened or closed by the movable slider and enabling the escape of fluid to be opened when the piston rises again.

2. The pick device according to claim 1, wherein the first and second longitudinal channels are formed outside the distribution portion and communicate in sealed manner with the radial channels, the radial channels formed in the body and the ring of the distribution portion.

3. The pick device according to claim 1, wherein the first and second longitudinal channels extend coaxially and adjacent to the distribution portion, over substantially the entire length thereof, and are each in the form of a groove with its opening facing the radial channels of the distribution portion.

4. The pick device according to claim 3, wherein at least one of the first and second longitudinal channels is in the form of a semi-cylindrical groove.

5. The pick device according to claim 1, wherein the variable control of the fluid is housed in the head of the cylinder closing off the upper portion of the cylinder, being connected to a supply section of the fluid by at least one flexible supply tube, just below an operating handle of the pick device, which is fixed to the cylinder head.

6. The pick device according to claim 1, wherein the ring further comprises at least one channel for controlling the raising of the slider which is open at the bottom position of the piston and connected to a control channel for the cylinder, the control channel for the cylinder opening into it the cylinder above the piston in the bottom position.

7. The pick device according to claim 1, wherein the body of the distribution portion comprises at least one radial escape channel, suitably positioned thereon to be opened or closed by the movable slider and thereby allow, when opened, communication with a raising channel for the piston on downward actuation of the latter without compressing the fluid in the lower portion of the cylinder.

8. The pick device according to claim 1, further comprising a small radial channel formed at the upper portion of the body, for controlling the slider, which, once the upwardly directed pick device has stopped, allows the movable slider to be pushed towards the pick member by enabling supply pressure to be applied to an upper edge surface of the slider, and pressure in the cylinder to be established, on actuation, to initiate the movement of the piston.

9. The pick device according to claim 1, wherein the pick device is adapted to operate at a high air pressure, such as 7 bars, or at low pressure, such as below 2 bars, or between the two.

10. The pick device according to claim 1, wherein the second longitudinal channel is connected to an upper piston raising channel extending within the thickness of the cylinder body and along the length of the cylinder, to the bottom thereof, the piston raising channel enabling the piston to move back up to the upper portion of the cylinder once it has arrived at the bottom of the cylinder and also allowing the air under the piston to escape during the travel of the piston towards the bottom of the cylinder, via two radial escape channels or holes provided in the upper body and opened by the movable slider.

11. The pick device according to claim 1, wherein the first longitudinal channel of the upper portion of the cylinder is connected to a radial channel of the upper body for supplying the cylinder with pressurised air, and to a radial channel of the distribution portion for controlling the movement of the slider.

12. The pick device according to claim 11, wherein the second longitudinal channel is connected to an upper piston raising channel extending within the thickness of the cylinder body and along the length of the cylinder, to the bottom thereof, the second longitudinal channel is connected to a radial raising channel of the upper body, and the second longitudinal channel is adjacent to the distribution portion and extends along substantially the entire length of the distribution portion.

13. The pick device according to claim 12, wherein the slider movement radial channel allows pressure to be applied to an upper shoulder surface of a control chamber for the slider.

14. The pick device according to claim 13, wherein the slider movement radial channel is not open to atmosphere.

15. The pick device according to claim 1, wherein the first and second longitudinal channels extend coaxially and adjacent to the upper body of the distribution portion, the first and second longitudinal channels extending at least along the entire length of the upper body.

16. The pick device according to claim 15, wherein the first and second longitudinal channels are in the form of grooves on an inner surface of the upper portion of the cylinder.

* * * * *